US011577697B2

(12) United States Patent
Kraemer

(10) Patent No.: US 11,577,697 B2
(45) Date of Patent: Feb. 14, 2023

(54) WIPER ARM SPOILER DEVICE HAVING AT LEAST ONE WASHING WATER CHANNEL

(71) Applicant: Robert Bosch GmbH, Stuttgart (DE)

(72) Inventor: Godelieve Kraemer, Huegelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/999,122

(22) Filed: Aug. 21, 2020

(65) Prior Publication Data
US 2021/0053532 A1 Feb. 25, 2021

(30) Foreign Application Priority Data
Aug. 22, 2019 (DE) .......................... 102019212550.6

(51) Int. Cl.
*B60S 1/04* (2006.01)
*B60S 1/34* (2006.01)
*B60S 1/52* (2006.01)

(52) U.S. Cl.
CPC ........... *B60S 1/0408* (2013.01); *B60S 1/3415* (2013.01); *B60S 1/522* (2013.01); *B60S 1/524* (2013.01)

(58) Field of Classification Search
CPC ........ B60S 1/522; B60S 1/524; B60S 1/0408; B60S 1/3805; B60S 1/3806; B60S 1/3808; B60S 1/381; B60S 1/52
USPC .......................... 15/250.04, 250.201, 250.02
See application file for complete search history.

(56) References Cited

U.S. PATENT DOCUMENTS

| 3,793,666 A | * | 2/1974 | Brillenburg Wurth ...................... B60S 1/522 15/250.04 |
| 4,782,547 A | * | 11/1988 | Mohnach ............... B60S 1/0408 15/250.04 |
| 10,077,028 B2 | * | 9/2018 | Ernst ...................... B60S 1/3429 |
| 2009/0089956 A1 | * | 4/2009 | De Block ............. B60S 1/3881 15/250.201 |
| 2011/0302738 A1 | * | 12/2011 | Egner-Walter .......... B60S 1/524 15/250.201 |
| 2016/0144827 A1 | * | 5/2016 | Ernst ........................ B60S 1/32 15/250.01 |
| 2017/0066416 A1 | * | 3/2017 | Waible ................... B60S 1/3856 |

FOREIGN PATENT DOCUMENTS

FR 2603850 * 3/1988
GB 1332602 * 10/1973

* cited by examiner

*Primary Examiner* — Gary K. Graham
(74) *Attorney, Agent, or Firm* — Michael Best & Friedrich LLP

(57) ABSTRACT

A wiper arm spoiler device having a base member (10a; 10b), having a wind deflector unit (12a; 12b) which is arranged on the base member (10a; 10b) and which has at least one wind deflector element (14a; 14b), having a coupling unit (16a; 16b) which is provided to couple the wind deflector unit (12a; 12b) to a wiper rod (18a; 18b) of a wiper arm (20a; 20b). The wiper arm spoiler device has at least one washing water channel (24a; 24b, 26b).

14 Claims, 2 Drawing Sheets

WIPER ARM SPOILER DEVICE HAVING AT LEAST ONE WASHING WATER CHANNEL

BACKGROUND OF THE INVENTION

A wiper arm spoiler device having a base member, having a wind deflector unit which is arranged on the base member and which has at least one wind deflector element, having a coupling unit which is provided to couple the wind deflector unit to a wiper rod of a wiper arm has already been proposed.

SUMMARY OF THE INVENTION

The invention is based on a wiper arm spoiler device having a base member, having a wind deflector unit which is arranged on the base member and which has at least one wind deflector element, having a coupling unit which is provided to couple the wind deflector unit to a wiper rod of a wiper arm.

It is proposed that the wiper arm spoiler device have at least one washing water channel.

Preferably, the coupling unit is provided to releasably couple the wind deflector unit to the wiper rod of a wiper arm, in particular in a non-destructive manner. In particular, the coupling unit is constructed as a clamping connection unit, as a locking connection unit, as an adhesive connection unit, as a screw connection unit, as a plug-type connection unit and/or as a magnet connection unit. Preferably, the coupling unit is provided to produce a tool-free connection. The term "provided" is intended in this context in particular to be understood to mean configured and/or equipped. The fact that an object is provided for a specific function is in particular intended to be understood to mean that the object performs and/or carries out this specific function in at least one application and/or operating state. Preferably, the coupling unit is provided to connect the base member and/or the wind deflector unit, in particular in a positive-locking, non-positive-locking and/or materially engaging manner to the wiper rod of the wiper arm. The coupling unit is preferably provided to arrange the base member and/or the wind deflector unit at least partially along the wiper rod. Preferably, the coupling unit is constructed integrally with the base member and/or the wind deflector unit. The term "integrally" is intended in particular to be understood to mean at least connected in a materially engaging manner, for example, by means of a welding process, an adhesive process, an injection process, in particular an extrusion process and/or another process which appears advantageous to the person skilled in the art, and/or advantageously formed in one piece, such as, for example, by means of production from a casting and/or by means of production in a single or multiple-component injection method and advantageously from a single blank. In particular, the base member and/or the wind deflector unit in a coupled state is/are connected to the wiper arm by means of the coupling unit. Preferably, the coupling unit is provided to retain the base member and/or the wind deflector unit in the coupled state on the wiper arm. The coupling unit preferably has at least one coupling element. The at least one coupling element is in particular provided to connect the wiper rod to the base member and/or the wind deflector unit. Preferably, the at least one coupling element preferably delimits at least one coupling recess at least to a large extent. The term "at least to a large extent" is intended in this instance to be understood to mean in particular at least 55%, advantageously at least 65%, preferably at least 75%, in a particularly preferred manner at least 85% and in a particularly advantageous manner at least 95% of a closed volume, a closed surface and/or a closed path of a reference object. The at least one coupling recess is preferably provided to receive the wiper rod. Preferably, in particular in the connected state of the base member and/or the wind deflector unit with respect to the wiper rod, a periphery of the wiper rod, preferably when viewed in a plane perpendicular to a main extent axis of the wiper rod, is arranged at least to a large extent inside the at least one coupling recess. A "main extent axis" of an object is intended in this instance in particular to be understood to be an axis which extends parallel with a longest edge of a smallest geometric parallelepiped which still just completely surrounds the object. The at least one coupling recess has, preferably in a plane at least substantially perpendicular to a main extent axis of the coupling unit, of the base member and/or of the wind deflector unit, a contour which is delimited by the at least one coupling element at least to a large extent in particular in a rectangular, polygonal, circular, elliptical and/or oval manner.

Furthermore, the wiper rod is constructed in particular as an elongate component of the wiper arm. Preferably, the wiper rod is provided to connect a drive axle of the wiper arm indirectly to a receiving region for a wiper blade in order to transmit a movement, in particular a rotational movement.

In particular, the wind deflector unit, preferably the at least one wind deflector element, is provided to deflect a travel wind acting on the wiper arm and/or to reduce a wind resistance of the wiper arm. The at least one wind deflector element is further preferably provided to direct a travel wind, to damp vibrations, to keep air friction low and/or to stiffen the wiper arm. In particular, the at least one wind deflector element of the wind deflector unit has at least one spoiler region, Preferably, the at least one spoiler region is provided to redirect and/or deflect a travel wind and/or a wind resistance force. Preferably, the at least one spoiler region has a wind direction face which is provided to deflect a fluid flow, in particular air flow. Preferably, the wind direction face is constructed at least to a large extent in a concave manner. Preferably, the spoiler region extends above a plane which extends perpendicularly to a vertical axis of the at least one wind deflector element and which intersects with the concave wind direction face at the lowest point.

In particular, the at least one washing water channel is constructed as at least one hollow space which is delimited at least to a large extent by a wall. Preferably, the washing water channel is constructed as a channel which is delimited by a hose line. In particular, the at least one washing water channel is arranged at least partially on the base member, the wind deflector unit, the at least one washing water channel and/or the coupling unit. Preferably, the at least one washing water channel is arranged at least partially inside the base member, the wind deflector unit and/or the coupling unit. In a particularly preferred manner, the at least one washing water channel, in particular a periphery which delimits the at least one washing water channel, is surrounded at least to a large extent by the base member, the wind deflector unit and/or the coupling unit. Preferably, the at least one washing water channel is provided to direct washing water. Preferably, the washing water channel has a main extent axis. In particular, the cross-section of the washing water channel, preferably in a plane perpendicular to the main extent axis, may have an oval, elliptical, square, rectangular and/or polygonal cross-section. In a particularly preferred manner, the washing water channel, when viewed in a plane perpendicular to the main extent axis of the washing water channel, has a circular cross-section. In a particularly preferred manner, the at least one washing water channel is provided to direct washing water from a store to at least one spray nozzle element. Preferably, the at least one washing water channel is provided to receive washing water for direction and/or conveying.

In particular, the wiper arm spoiler device has at least one receiving unit for receiving the at least one washing water channel. Preferably, the receiving unit is provided to receive the at least one washing water channel which is delimited by a hose line. Preferably, the receiving unit, in particular in a received state of the at least one washing water channel, is provided to retain the at least one washing water channel. In a particularly preferred manner, the receiving unit has at least one receiving element. The at least one receiving element is in particular provided to receive the at least one washing water channel, in particular the wall which delimits the washing water channel, preferably, the at least one hose line. In particular the at least one receiving element is constructed integrally with the wind deflector unit, the coupling unit and/or the base member. Preferably, the at least one receiving element is arranged on a side wall of the wind deflector unit, the coupling unit and/or the base member. Preferably, the at least one receiving element is constructed at least partially as a recess delimited by the wind deflector unit, the coupling unit and/or the base member. In a particularly preferred manner, the at least one receiving element is constructed at least partially as a continuation on the wind deflector unit, the coupling unit and/or the base member. In particular, the at least one receiving element, preferably in the received state of the at least one washing water channel, is provided to engage around the at least one washing water channel at least to a large extent. Preferably, the at least one receiving element is constructed as a clamping element and/or support element. Preferably, the clamping element has at least one clamping wing. The at least one clamping wing is preferably provided, in particular in the received state of the at least one washing water channel on the at least one receiving element, to retain the hose line clamped on the at least one receiving element. Preferably, the at least one clamping wing, in particular in the received state, is provided to apply a clamping force to the hose line. Preferably, the at least one clamping wing is provided to retain the hose line clamped on the clamping element using the clamping force. In a particularly preferred manner, the at least one clamping wing is provided to be redirected when the at least one washing water channel is assembled. In particular, the at least one clamping wing has with the at least one clamping element a resilient coupling and/or connection, Preferably, the at least one clamping wing is constructed as a resilient clamping wing. Preferably, the resilient clamping wing can be repeatedly deformed without the clamping wing thereby becoming mechanically damaged or destroyed. Furthermore, in particular after a deformation, the clamping wing seeks to independently return to a basic shape. In a particularly preferred manner, the at least one clamping wing is provided to be resiliently redirected during assembly. In particular, the at least one receiving element delimits at least one receiving space. In particular, the at least one receiving element delimits the at least one receiving space at least substantially parallel with a main extent axis of the wiper rod and/or the base member. The term "substantially parallel" is intended in particular to be understood to be an orientation of a direction relative to a reference direction, in particular in a plane, wherein the direction with respect to the reference direction has a deviation in particular less than 8°, advantageously less than 5° and, in a particularly advantageous manner, less than 2°. In a particularly preferred manner, a periphery of the at least one receiving space in the cross-section perpendicular to the main extent axis of the wiper rod is closed in an incomplete manner. In particular, the periphery of the receiving space in the cross-section perpendicular to the main extent axis delimits a recess. Alternatively, the at least one washing water channel may be constructed integrally with the base member, with the at least one wind deflector unit and/or with the coupling unit, and/or formed in each case so as to be delimited by the base member, the at least one wind deflector unit and/or the coupling unit.

As a result of the configuration of the wiper arm spoiler device according to the invention, an advantageously flexible and/or varied applicability and/or formability can be achieved. A washing water channel may advantageously be arranged in a secure and/or readily accessible manner on the wiper arm spoiler device. In a particularly advantageous manner, a loss of a washing water channel unit during operation can advantageously be prevented. In a particularly advantageous manner, undesirable release of the washing water channel unit can be prevented to the greatest possible extent. Advantageously, a structural space available can be used for integration and/or orientation of the washing water channel unit. Furthermore, an assembly of the base member with the wiper rod can advantageously be achieved regardless of a receiving state of the washing water channel. Advantageously, a large number of components can advantageously be reduced. In a particularly advantageous manner, a weight of the configuration according to the invention and/or a production complexity and/or production costs and assembly costs can be kept small.

It is further proposed that the washing water channel be arranged at least partially inside the at least one wind deflector element. In particular, the at least one washing water channel is arranged in a direction parallel with a vertical axis of the at least one wind deflector element in a region above the coupling receiving region. Preferably, the washing water channel is arranged in a mounted functional state in the direction of a normal on a windshield above the wiper rod. Preferably, the at least one washing water channel is arranged completely in a region at the side of the concave wind direction face. Preferably, the at least one washing water channel is arranged in an upper third of a maximum overall extent of the at least one wind deflector element parallel with the vertical axis and/or in a region at the side of an upper third of the wind direction face. Furthermore, the at least one washing water channel is arranged preferably completely in the spoiler region of the at least one wind deflector element. Preferably, the at least one washing water channel is arranged above a plane which extends perpendicularly to the vertical axis of the at least one wind deflector element and which intersects with the concave wind direction face. Preferably, the at least one washing water channel is arranged in an upper half of the spoiler region. As a result of the configuration according to the invention, advantageous injection angles can be achieved.

It is further proposed that the at least one washing water channel be constructed at least partially integrally with the base member, with the wind deflector unit and/or with the coupling unit. In particular, the at least one washing water channel is formed at least partially by the base member, the wind deflector unit and/or the coupling unit. Preferably, the base member, the wind deflector unit and/or the coupling unit form(s) a wall of the at least one washing water channel. Preferably, the at least one washing water channel is delimited at least partially by the base member, the wind deflector unit and/or the coupling unit. Alternatively, it is conceivable for the at least one hose line which delimits the at least one washing water channel to be surrounded at least to a large extent by the base member, the wind deflector unit and/or the coupling unit and/or to be constructed at least partially in an integral manner with the base member, the wind deflector unit and/or the coupling unit. As a result of the configuration of the wiper arm spoiler device according to the invention, a high level of efficiency with regard to structural space can advantageously be achieved. A large number of components can advantageously be kept small. In a particularly advantageous manner, components can be combined and/or a wind resistance of the wiper arm spoiler device according to the invention can be kept small.

It is further proposed that the wiper arm spoiler device have at least one spray nozzle element. In particular, the at least one spray nozzle element is provided to discharge washing water. Preferably, the at least one spray nozzle element has a fluid connection to the at least one washing water channel. In particular, the at least one spray nozzle element delimits at least one spray channel for directing washing water. In particular, the at least one spray nozzle element delimits the at least one spray channel with a circular, oval and/or elliptical cylinder contour, with a circular, oval and/or elliptical conical contour, with a square, rectangular and/or polygonal parallelepipedal contour and/or with a square, rectangular and/or polygonal pyramid contour. Preferably, the at least one spray nozzle element is orientated transversely relative to the main extent axis of the at least one washing water channel. In a particularly preferred manner, the at least one main spray nozzle is orientated at least substantially perpendicularly to the at least one washing water channel. Preferably, the at least one spray nozzle element has a main extent axis and/or a main spraying direction which extend(s) transversely relative to that of the at least one washing water channel. Preferably, the main extent axis and/or the main spraying direction of the at least one spray nozzle element extend(s) at least substantially perpendicularly to the at least one washing water channel. Preferably, the main spraying direction of the at least one spray nozzle element extends at least substantially parallel with the main axis of the spray nozzle element through a center point of a cross-section which is delimited by the spray nozzle element at an end of the spray nozzle channel facing away from the at least one washing water channel. As a result of the configuration of the washing arm spoiler device according to the invention, a particularly flexible applicability can advantageously be achieved. A particularly high level of efficiency in terms of structural space can advantageously be achieved. Component diversity can advantageously be kept small. In a particularly advantageous manner, components can be combined and/or a wind resistance of the wiper arm spoiler device according to the invention can be kept low.

It is further proposed that the at least one spray nozzle element be constructed at least partially integrally with the base member, the wind deflector unit and/or the coupling unit. Preferably, the at least one spray nozzle element is arranged at least partially inside the base member, the wind deflector unit, the coupling unit and/or a wall which delimits the at least one washing water channel. Preferably, the at least one spray nozzle channel of the at least one spray nozzle element is at least partially delimited by the base member, the wind deflector unit and/or the coupling unit. Preferably, the at least one spray nozzle channel of the at least one spray nozzle element is at least to a large extent delimited by the spoiler region. As a result of the configuration of the wiper arm spoiler device according to the invention, a high level of efficiency with regard to structural space can advantageously be achieved. Component diversity can advantageously be kept small. In a particularly advantageous manner, components can be combined and/or a wind resistance of the wiper arm spoiler device according to the invention can be kept low.

It is further proposed that the base member, the wind deflector unit, the at least one washing water channel and/or the coupling unit be constructed from at least two material components. Preferably, the base member, the wind deflector unit, the at least one washing water channel and/or the coupling unit are constructed as a multiple-component injection-molded component and/or multiple-component extruded component. Preferably, the base member, the wind deflector unit, the at least one washing water channel and/or the coupling unit is/are constructed in each case in an integral manner from at least two material components. In particular, the at least two material components have differing optical, mechanical and/or electrical material properties. Preferably, the at least two material components are constructed from a thermoplastic material, at least one metal and/or at least one biomaterial, in particular thermoplastic starch or WPC. Preferably, the at least two material components have a fixed connection to each other. In a particularly preferred manner, the at least two material components are connected to each other in a solidified state. Preferably, the at least two material components are connected so as to be fixed in position relative to each other and/or in a materially engaging manner. As a result of the configuration of the wiper arm spoiler device according to the invention, a component may comply with a large number of different requirements with regard to material parameters, such as weight and/or stability. A high level of efficiency with regard to structural space can advantageously be achieved. Component diversity can advantageously be kept small. In a particularly advantageous manner, components can be combined and/or a wind resistance of the wiper arm spoiler device according to the invention can be kept low.

It is further proposed that at least one material component of the at least two material components have relative to at least one additional material component of the at least two material components, in particular in a state, preferably in the solidified state already mentioned above, a lower level of resilience and the at least one washing water channel and/or the at least one spray nozzle element be formed or delimited at least partially integrally by the at least one additional material component. Preferably, the base member, the wind deflector unit, the at least one washing water channel and/or the coupling unit has/have at least one region which has at least one material component. Furthermore, the base member, the wind deflector unit, the at least one washing water channel and/or the coupling unit has/have at least one additional region which has the at least one additional material component. In particular, the at least one additional material component has an elasticity modulus which is in particular at least 30%, preferably at least 60%, preferably at least 90%, in a particularly preferred manner at least 120%, advantageously at least 150%, and in a particularly advantageous manner at least 200% greater relative to an elasticity modulus of the at least one material component.

Preferably, in a limited manner, the at least one washing water channel and/or the at least one spray nozzle element is/are arranged at least to a large extent in the at least one additional region of the base member, the wind deflector unit and/or the coupling unit. In a particularly preferred manner, the at least one washing water channel and/or the at least one spray nozzle element is/are constructed to be surrounded at least to a large extent by the at least one additional region of the base member, the wind deflector unit and/or the coupling unit. In a particularly advantageous manner, the at least one additional region of the base member, the wind deflector unit and/or the coupling unit delimit(s) the at least one washing water channel and/or the at least one spray nozzle element, in particular the at least one spray channel, at least to a large extent, preferably completely. As a result of the configuration according to the invention, a washing-water-pressure-related deformation of the wiper arm spoiler device can in a particularly advantageous manner be kept small. Material fatigue and/or wear, in particular as a result of pressure fluctuations and/or pressure peaks, can advantageously be counteracted. Furthermore, components can advantageously be combined. Structural space can advantageously be used in an efficient manner.

It is further proposed that the wiper arm spoiler device have at least one, in particular integrated, heating element. In particular, the at least one heating element is provided to heat the at least one washing water channel. Preferably, the at least one heating element is provided to prevent freezing of the washing water in the at least one washing water channel unit. Preferably, the at least one heating element is operated electrically. Preferably, the at least one heating element is constructed as at least one heating wire or as at least one heating cartridge. In particular, the at least one heating element extends at least substantially parallel with a main extent axis of the at least one washing water channel. In particular, the at least one heating element is arranged on the base member, the wind deflector unit and/or the coupling unit. Preferably, the at least one heating element is at least partially surrounded by the base member, the wind deflector unit and/or the coupling unit. In a particularly preferred manner, the at least one heating element is constructed to be injected around by at least one of the at least two material components at least to a large extent. In particular, the at least one heating element is arranged in the vicinity of the periphery delimiting the at least one washing water channel. Preferably, at least a majority of an overall extent of the at least one heating element has a largest spacing with respect to the periphery which delimits the at least one washing water channel of in particular less than 5 mm, preferably less than 4 mm, preferably less than 3 mm and in a particularly preferred manner less than 2 mm. As a result of the configuration according to the invention, an advantageously operationally reliable wiper arm spoiler device can be achieved. Reliable operation can advantageously be achieved at low ambient temperatures. An advantageously flexible applicability, in particular with respect to a climate and/or ambient temperature, of the wiper arm spoiler device according to the invention can be provided.

It is further proposed that the washing water channel be arranged, in a state, in particular in the above-mentioned coupled state of the base member, on the wiper rod outside center planes of the wiper rod. In particular, a first of the center planes of the wiper rod extends at least substantially parallel with a main extent plane of the wiper rod. A "main extent plane" of a structural unit is in particular intended to be understood to be a plane which is parallel with a largest side face of a smallest notional parallelepiped which still just completely surrounds the structural unit. Furthermore, another of the center planes extends at least substantially perpendicularly to the main extent plane of the wiper rod. The term "substantially perpendicularly" is intended in particular to define an orientation of a direction relative to a reference direction, wherein the direction and the reference direction, in particular when viewed in a projection plane, enclose an angle of 90° and the angle has a maximum deviation of in particular less than 8°, advantageously less than 5° and in a particularly advantageous manner less than 2°. Preferably, the center planes of the wiper rod extend through a geometric center point and/or through a center of mass of the wiper rod, in particular when viewed in a plane perpendicular to a main extent axis of the wiper rod. In particular, the at least one washing water channel in the coupled state of the base member and/or the wind deflector unit on the wiper rod, does not intersect with the center plane of the wiper rod. Furthermore, the center plane of the wiper rod, preferably in the coupled state of the base member on the wiper rod, is in particular arranged spaced apart from the at least one washing water channel. Preferably, a minimum spacing between the center plane of the wiper rod and the at least one washing water channel is in particular greater than 0.5 mm, preferably greater than 1 mm, preferably greater than 2 mm and in a particularly preferred manner greater than 3 mm. In a particularly preferred manner, the wall which delimits the at least one washing water channel does not intersect with the at least one center plane. In particular, the contour which delimits the coupling recess of the coupling unit has at least a first center plane and at least one additional center plane. The at least one first center plane of the contour which delimits the coupling recess preferably extends at least substantially parallel with a main extent plane of the base member, the wind deflector unit and/or the coupling unit. The at least one additional center plane of the contour which delimits the coupling recess preferably extends at least substantially perpendicularly to the main extent plane of the base member, the wind deflector unit and/or the coupling unit. Preferably, the center planes of the contour which delimits the coupling recess extend through a geometric center point of the contour which delimits the coupling recess, in particular when viewed in a plane perpendicular to a main extent axis of the wiper rod. In particular, the at least one washing water channel extends in an operating state outside an intersection with one of the center planes of the contour which delimits the coupling recess. Preferably, a minimum spacing between one of the center planes of the contour which delimits the coupling recess and the at least one washing water channel is in particular greater than 0.5 mm, preferably greater than 1 mm, preferably greater than 2 mm and in a particularly preferred manner greater than 3 mm. In a particularly preferred manner, the wall which delimits the at least one washing water channel does not intersect with the at least one of the center planes of the contour which delimits the coupling recess. As a result of the configuration of the wiper arm spoiler device according to the invention, an advantageous use of space can be achieved. In a particularly advantageous manner, a flexible and/or readily accessible arrangement of the washing water channel can be provided.

It is further proposed that the wiper arm spoiler device have at least two washing water channels, in particular two of the above-mentioned at least one washing water channels. Preferably, the wiper arm spoiler device has at least a first washing water channel and at least one additional washing water channel. Preferably, the at least two washing water channels are provided to direct washing water independently of each other. Preferably, the at least two washing water channels are each delimited by the at least one hose line. In particular, the receiving unit has at least two receiving elements, in particular two of the at least one receiving element already mentioned above. The at least two receiving elements are each provided to receive the at least one washing water channel delimited by the hose line. In particular, the at least two receiving elements are provided to retain the hose line. Preferably, the at least two receiving elements are provided to retain the hose line. Preferably, the at least two receiving elements are provided to retain the hose line on the wind deflector unit, the coupling unit and/or the base member, in particular in a clamped manner. In particular, the at least two receiving elements are each provided to retain the hose line in a materially engaging, positive-locking, non-positive-locking and/or magnetic manner. As a result of the configuration according to the invention, a wiper arm spoiler device which is particularly simple to assemble can be provided. In particular, a particularly advantageously simple receiving of the washing water channel can be achieved. Preferably, the wiper arm spoiler device can be clamped in a simple manner by an operator on the wiper rod. An advantageously reliable and/or easily accessible receiving of the washing water channel can be provided. In a particularly advantageous manner, a washing water channel unit can be received on a non-releasable manner. In a particularly advantageous manner, an undesirable loss and/or undesirable release of the washing water channel unit can be prevented to the greatest possible extent. Alternatively, the at least two washing water channels may each be formed integrally with the base member, with the at least one wind deflector unit and/or with the coupling unit and/or be constructed to be delimited in each case by the base member, the at least one wind deflector unit and/or the coupling unit. As a result of the configuration according to the invention, spray nozzle elements and/or additional nozzles can advantageously be supplied with washing water in a manner dependent on the wiping direction. A wide application range can advantageously be covered. Advantageously efficient, simple and/or high-volume washing water transport can be provided.

It is further proposed that the at least two washing water channels be arranged on at least two sides of the base member, the wind deflector unit and/or the coupling unit which are separated by a main extent plane, in particular by the main extent plane of the base member already mentioned above.

In particular, the at least two washing water channels are arranged on different sides of the base member, the wind deflector unit and/or the coupling unit relative to the main extent plane of the base member. Preferably, the at least two washing water channels each have a main extent axis. The respective main extent axis extends through a geometric center point of the contour which delimits the respective washing water channel. In particular when viewed in a plane perpendicular to one of the main extent axes of the at least two washing water channels, a connection axis, between the main extent axis of the at least one washing water channel and the main extent axis of the base member relative to the main extent axis of the at least one additional washing water channel and the main extent axis of the base member, has an angular offset. Preferably, the angular offset is in particular at least 15°, preferably at least 30°, preferably at least 45°, in a particularly preferred manner at least 60°, advantageously at least 90° and in a particularly advantageous manner at least 120°. Preferably, the at least two washing water channels are arranged at sides of the base member, the wind deflector unit and/or the coupling unit facing away from each other. Preferably, two sides of the base member or the wind deflector unit facing away from each other have surface normals having a relative angular offset with respect to each other. Preferably, the relative angular offset is in particular at least 45°, preferably at least 60°, preferably at least 90°, in a particularly preferred manner at least 120°, advantageously at least 150° and in a particularly advantageous manner at least 180°. As a result of the configuration of the wiper arm spoiler device according to the invention, an efficient use of a structural space can advantageously be achieved. Washing water channels can advantageously be received in a simple manner. Advantageously, the configuration according to the invention can be configured in a flexible manner. It is possible to achieve an advantageously simple and/or flexible orientation of the washing water channels. Advantageously, a structural and/or functional distinction of the washing water channels and/or a purpose of the washing water channels, such as in particular a spraying device, can advantageously be identified by means of an orientation and/or arrangement.

Furthermore, a windshield wiper having at least one wiper arm and having at least one wiper arm device according to the invention is proposed. Preferably, the wiper arm has at least one wiper arm adapter for coupling to a wiper blade. The windshield wiper is a component of a windshield wiper system. The windshield wiper system preferably has a drive unit having a drive shaft, Preferably, the wiper arm can be pivotably driven by means of the drive shaft of the drive unit. Furthermore, the windshield wiper system preferably has a washing water fluid container and a washing water pump. Preferably, the at least one washing water channel is coupled to the washing water fluid container and/or the washing water pump in technical fluid terms. In particular, the washing water pump is provided to convey washing water from the washing water fluid container into the at least one washing water channel. Preferably, the at least one washing water channel is at least partially arranged on the wiper arm. In a particularly preferred manner, the at least one washing water channel is at least partially connected to the wiper arm. Furthermore, the at least one washing water channel is arranged at least partially on the wiper arm adapter. In particular, a main spray nozzle may be arranged on the wiper arm adapter. The main spray nozzle is preferably provided to discharge washing water. As a result of the configuration according to the invention, an advantageously operationally reliable windshield wiper can be provided. Vibrations can be prevented to the greatest possible extent. In particular, a rigidity of the windshield wiper, in particular at high wind speeds, can advantageously be kept stable. Furthermore, the windshield wiper can advantageously be prevented from lifting off at high wind speeds. Furthermore, an air resistance of the windshield wiper can advantageously be kept low. A reliable and/or easy-to-assemble wiper arm spoiler device can be provided. In a particularly advantageous manner, the wiper arm spoiler device can be received on the wiper arm in a non-releasable manner. In a particularly advantageous manner, undesirable loss and/or undesirable release of the wiper arm spoiler device from the windshield wiper can be prevented to the greatest possible extent. An integration and/or orientation of the washing water channel unit can advantageously be provided.

In this instance, the wiper arm spoiler device according to the invention is not intended to be limited to the above-described application and embodiment. In particular, the wiper arm spoiler device according to the invention in order to perform a functionality which is described herein may have a number of individual elements, components and units which differs from the number mentioned herein. In addition, in the value ranges set out in this disclosure, values which are within the limits mentioned should also be considered to be disclosed and freely usable.

BRIEF DESCRIPTION OF THE DRAWINGS

Other advantages will be appreciated from the following description of the drawings. The drawings show two embodiments of the invention. The drawings, the description and the claims contain a number of features in combination. The person skilled in the art will advantageously also consider the features individually and combine them to form other advantageous combinations.

In the drawings.

DETAILED DESCRIPTION

Figure 1:
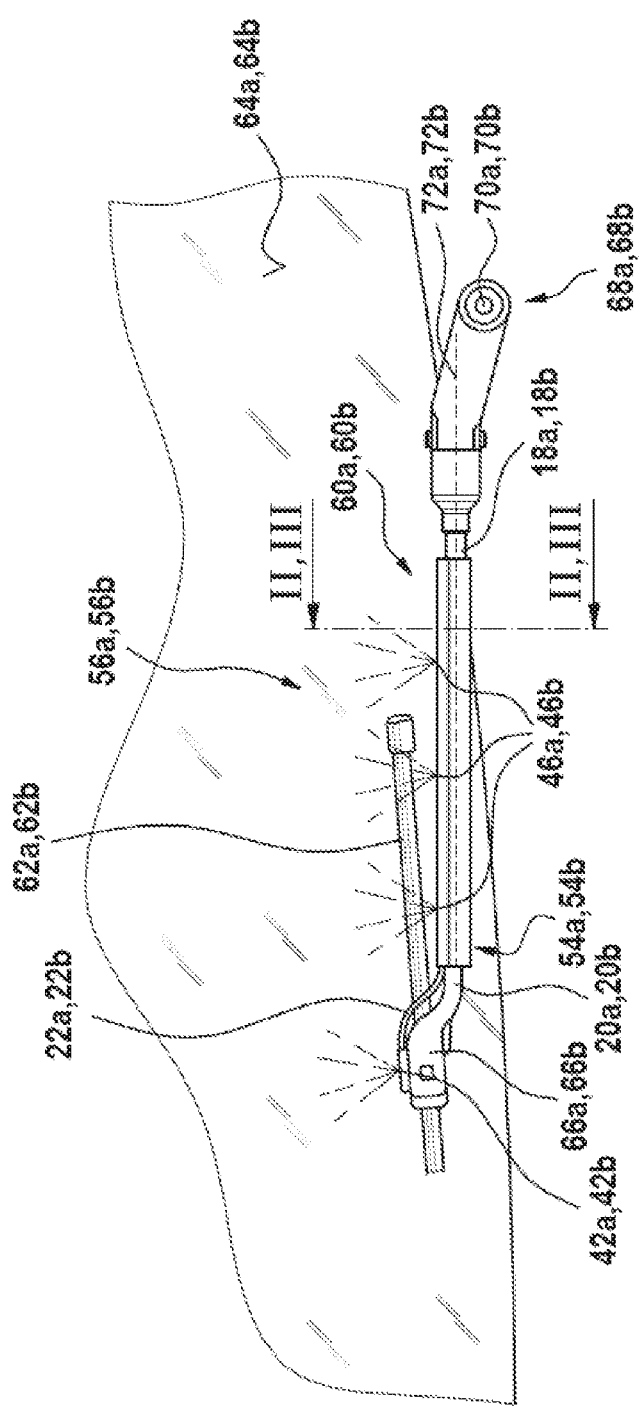
FIG. 1 shows a windshield wiper according to the invention of a windshield wiper system having a wiper arm spoiler device according to the invention.

FIG. 1 shows a windshield wiper system having a windshield wiper 60a, 60b. The windshield wiper has the wiper arm spoiler device 58a, 58b, a wiper arm 20a, 20b and a wiper blade 62a, 62b. Furthermore, FIG. 1 shows a surface 64a, 64b which is intended to be washed of a motor vehicle which cannot be seen in greater detail. The surface 64a, 64b which is intended to be washed is formed by a motor vehicle pane.

The wiper arm 20a, 20b has a wiper rod 18a, 18b and a wiper arm adapter 66a, 66b. The wiper rod 18a, 18b has in a plane perpendicular to a main extent axis 72a, 72b of the wiper rod 18a, 18b a rectangular cross-section. The wiper arm adapter 66a, 66b is provided for coupling the wiper blade 62a, 62b to the wiper arm 20a, 20b. The wiper arm adapter 66a, 66b is constructed to receive a wiper blade adapter of the wiper blade 62a, 62b which is not illustrated in greater detail. The wiper blade 62a, 62b has the wiper blade adapter for coupling to the wiper arm 20a, 20b. The wiper blade 62a, 62b is provided to wipe in a wiping operation state over the surface 64a, 64b which is intended to be washed. The wiper lip of the wiper blade 62a, 62b which cannot be seen in greater detail is provided during the wiping operation state to abut the surface 64a, 64b which is intended to be washed and to wipe over it. A washing water channel unit 22a, 22b is partially arranged on the windshield wiper 60a, 60b. The washing water channel unit 22a, 22b is partially directly and partially indirectly connected to the wiper arm 20a, 20b of the windshield wiper 60a, 60b. The washing water channel unit 22a, 22b is provided to direct washing water along the wiper arm 20a, 20b. Furthermore, the windshield wiper system has a drive unit 68a, 68b having a drive shaft 70a, 70b. The wiper arm 20a, 20b can be pivotably driven by means of the drive shaft 70a, 70b of the drive unit 68a, 68b. Furthermore the windshield wiper system has a washing water fluid container which is not illustrated in greater detail and a washing water pump which is not illustrated in greater detail. The washing water pump is provided to convey washing water from the washing water fluid container. Furthermore, the washing water channel unit 22a, 22b is provided to guide washing water conveyed by the washing water pump. The washing water channel unit 22a, 22b directs washing water to spray nozzle elements 46a, 46b. The spray nozzle elements 46a, 46b are provided to discharge washing water onto the surface 64a, 64b. Furthermore, the washing water channel unit 22a, 22b directs washing water to a main spray nozzle 42a, 42b. The main spray nozzle 42a, 42b is arranged in the wiper arm adapter 66a, 66b. The main spray nozzle 42a, 42b is preferably provided to discharge washing water onto the surface 64a, 64b.

Figure 2:
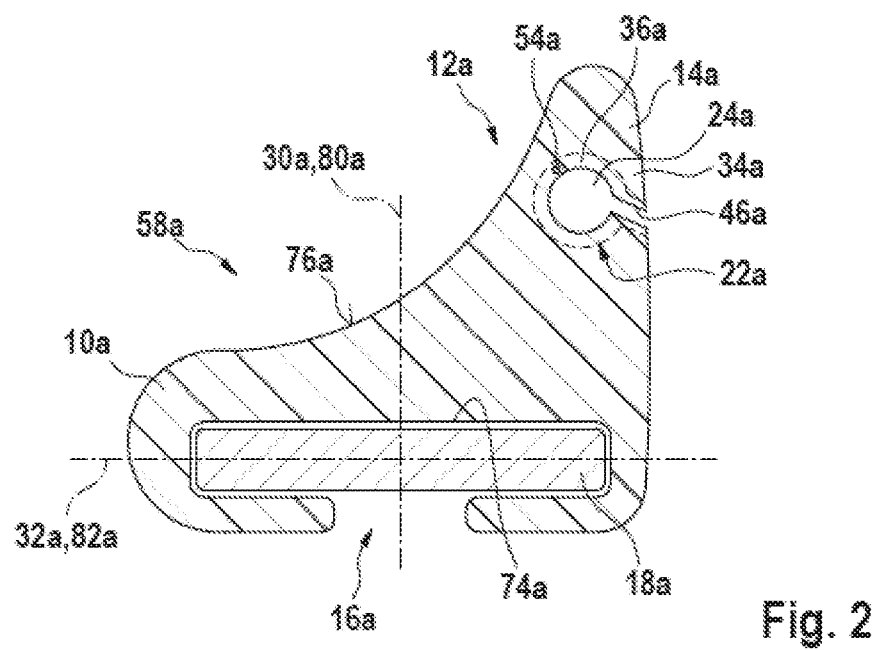
FIG. 2 is a sectioned illustration (II-II) of a wiper arm spoiler device having a washing water channel which is delimited by a receiving element.

FIG. 2 shows the wiper arm spoiler device 58a in a plane of section perpendicular to the main extent axis 72a of the wiper rod 18a. The wiper arm spoiler device 58a has a base member 10a. Furthermore, the wiper arm spoiler device 58a has a coupling unit 16a. The coupling unit 16a is provided to couple the wiper arm spoiler device 58a to the wiper rod 18a of the wiper arm 20a. The coupling unit 16a is constructed integrally with the base member 10a. The coupling unit 16a has a coupling element 74a. The coupling element 74a is constructed integrally with the base member 10a. The coupling element 74a delimits a coupling recess. The coupling element 74a surrounds the wiper rod 18a to a large extent in a state in which the wiper arm spoiler device 58a is coupled to the wiper rod 18a. The coupling element 74a is constructed to a large extent in a closed manner in a peripheral direction. Furthermore, the coupling element 74a forms an open portion in the peripheral direction. The open portion is provided to allow the wiper rod 18a to pass in the event of assembly and/or disassembly. The coupling element 74a is provided to receive and retain the wiper rod 18a. The coupling element 74a is provided to securely couple the wiper arm spoiler device 58a on the wiper rod 18a. The wiper rod 18a is received in a positive-locking manner in the wiper arm spoiler device 58a by means of the coupling element 74a.

Furthermore, the wiper arm spoiler device 58a has a wind deflector unit 12a. The wind deflector unit 12a is arranged on the base member 10a. The wind deflector unit 12a is constructed integrally with the base member 10a. The base member 10a and the coupling unit 16a are provided to couple the wind deflector unit 12a to the wiper rod 18a. The wind deflector unit 12a has a wind deflector element 14a. The wind deflector element 14a has a concave wind direction face 76a. Furthermore, the wind deflector element 14a has a spoiler region. The spoiler region extends above a plane which extends perpendicularly to a vertical axis of the wind deflector element 14a and which intersects with the concave wind direction face 76a. The wind direction face 76a is provided to direct an air flow, preferably a travel wind.

Furthermore, the washing water channel unit 22a is arranged within the wiper arm spoiler device 58a. The washing water channel unit 22a has a washing water channel 24a to direct the washing water. The washing water channel 24a is constructed integrally with the wind deflector unit 12. The washing water channel 24a is constructed integrally with the wind deflector element 14a. The washing water channel 24a is arranged in an upper half of the spoiler region. The washing water channel 24a is constructed integrally with the spoiler region of the wind deflector element 14a. The spoiler region delimits the washing water channel 24a to a large extent. The washing water channel 24a is constructed as a hollow space which is delimited by the spoiler region of the wind deflector element 14a. The washing water channel 24a is arranged completely inside the wind deflector element 14a. The washing water channel 24a is delimited in a circular-cylindrical manner by the wind deflector element 14a. In the plane perpendicular to the main extent axis 72a of the wiper rod 18a, the washing water channel 24a is delimited by a substantially cylindrical contour in the spoiler region. Furthermore, spray nozzle elements 46a are introduced into the washing water channel 24a. A spray nozzle channel of the spray nozzle elements 46a is delimited by the wind deflector element 14a of the wind deflector unit 12a. The spray nozzle elements 46a are constructed integrally with the wind deflector element 14a of the wind deflector unit 12a. FIG. 2 shows a spray nozzle element 46a, based on which an embodiment of all the spray nozzle elements 46a is intended to be described below by way of example. The spray nozzle element 46a is provided to discharge washing water from the washing water channel 24a. The spray nozzle element 46a is constructed as a cylindrical channel. The spray nozzle element 46a is orientated in such a manner that it discharges washing water onto the surface 64a which is intended to be washed. The spray nozzle element 46a has a main spray direction. The main spray direction extends substantially parallel with a main extent axis of the spray nozzle element 46a which is constructed as a cylindrical channel and is orientated to face away from the washing water channel 24a. Furthermore, the main extent axis of the spray nozzle element 46a extends transversely relative to the main extent axis 72a of the wiper rod 18a. Furthermore, the main extent axis of the spray nozzle element 46a extends perpendicularly to a main extent axis of the washing water channel 24a. The main spray direction of the spray nozzle element 46a is arranged to face away from the wind direction face 76a.

In the coupled state of the base member 10a on the wiper rod 18a, the washing water channel 24a which is constructed integrally with the wind deflector element 14a is arranged outside two center planes 30a, 32a of the wiper rod 18a. The wiper rod 18a has a first center plane 30a and a second center plane 32a. The first center plane 30a extends perpendicularly to a first side face of the rectangular cross-section of the wiper rod 18a and through a geometric center point of the rectangular cross-section of the wiper rod 18a. The second center plane 32a extends perpendicularly to a second side face of the rectangular cross-section of the wiper rod 18a, which extends perpendicularly to the first side face, and through the geometric center point of the rectangular cross-section of the wiper rod 18a. The washing water channel 24a is arranged in the wind deflector element 14a so as not to intersect with the center plane. The washing water channel 24a is arranged spaced apart from the two center planes 30a, 32a of the wiper rod 18a. A wall which delimits the washing water channel 24a has no intersection with one of the two center planes 30a, 32a of the wiper rod 18a. Furthermore, the washing water channel 24a is arranged outside two center planes 80a, 82a of the coupling recess delimited by the coupling element 74a. The contour delimited by the coupling element 74a of the coupling unit 16a is constructed in a square manner. The square contour has a first center plane 80a and a second center plane 82a. The first center plane 80a of the square contour extends substantially parallel with the main extent plane of the base member 10a. The second center plane 82a extends substantially perpendicularly to the main extent plane of the base member 10a, the wind deflector unit 12a and/or the coupling unit 16a. The two center planes 80a, 82a of the contour which delimits the coupling recess extend through a geometric center point of the square contour. The washing water channel 24a has no intersection with the two center planes 80a, 82a of the square recess. The first center plane 80a extends parallel with the first center plane 30a of the wiper rod 18a. The second center plane 82a extends parallel with the second center plane 32a of the wiper rod 18a.

Furthermore, the wind deflector unit 12a is formed from two material components 34a, 36a. The wind deflector element 14a of the wind deflector unit 12a has a first material component 34a and a second material component 36a. Furthermore, the wind deflector unit 12a is constructed as a multiple-component injection-molded component. The two material components 34a, 36a have a fixed connection to each other. The first material component 34a has a lower level of resilience than the second material component 36a. The second material component 36a has an elasticity modulus which is 150% greater than that of the first material component 34a. The additional material component 36a delimits a spray channel of the spray nozzle elements 46a and the washing water channel 24a completely. The second material component 36a is provided to reinforce the washing water channel 24a and the spray nozzle elements 46a.

Furthermore, the wiper arm spoiler device 58a has a heating element 54a. The heating element 54a is arranged on the contour which delimits the washing water channel 24a. Furthermore, the heating element 54a is integrated in the wind deflector element 14a. The second material component 34a is injected around the heating element 54a. The heating 54a is provided to heat the washing water channel 24a. The heating element 54a is constructed as an electric heating wire. The heating element 54a is orientated parallel with the main extent axis 72a of the wiper rod 18a. Furthermore, the heating element 54a is arranged in the vicinity of the wall which delimits the washing water channel 24a. The heating element 54a has at the most a spacing value with respect to the contour which delimits the washing water channel 24a from a spacing value range from 1 mm to 4 mm.

Figure 3:
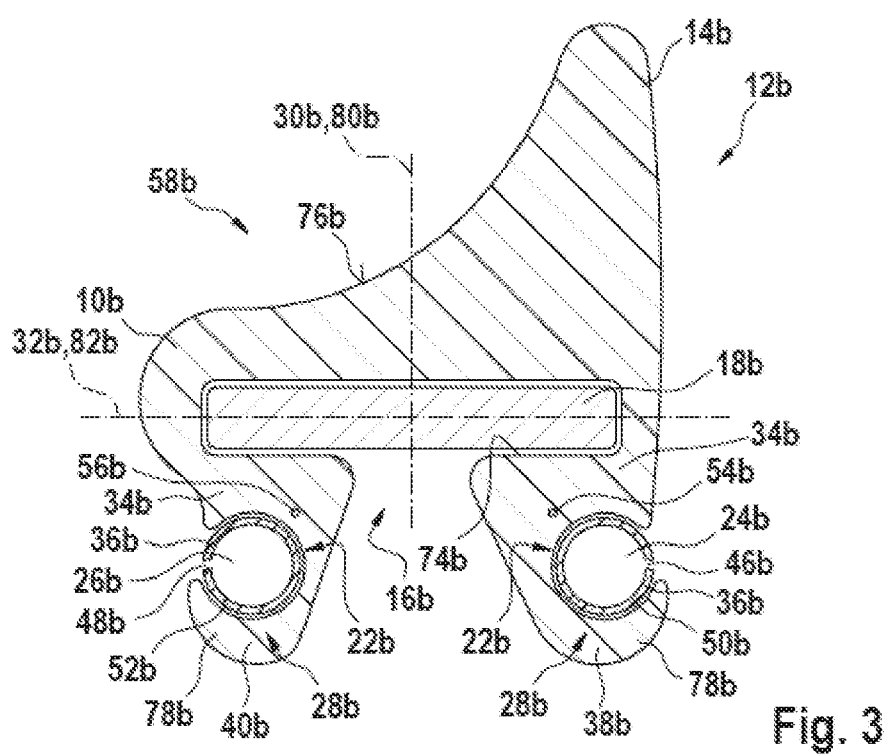
FIG. 3 is another sectioned illustration (III-III) of an alternative wiper arm spoiler device having two washing water channels which are delimited by hose lines and which are each received by a receiving element.

FIG. 3 shows another embodiment of the invention. The following descriptions and the drawings are limited substantially to the differences between the embodiments, wherein with respect to components which have identical names, in particular with respect to components with the same reference numerals, reference may also be made in principle to the drawings and/or the description of the other embodiments, in particular of FIGS. 1 and 2. In order to distinguish the embodiments, the letter a is placed after the reference numerals of the embodiment in FIG. 2. In the alternative embodiment of FIG. 3, the letter a is replaced with the letter b.

FIG. 3 shows the wiper arm spoiler device 58b in a plane of section perpendicular to the main extent axis 72b of the wiper rod 18b. The wiper arm spoiler device 58b has a base member 10b. Furthermore, the wiper arm spoiler device 58a has a coupling unit 16b. The coupling unit 16b is provided to couple the wiper arm spoiler device 58b to the wiper rod 18b of the wiper arm 20b. The coupling unit 16b is constructed integrally with the base member 10b. The coupling unit 16b has a coupling element 74b. The coupling element 74b is constructed integrally with the base member 10b. The coupling element 74b delimits a coupling recess. In a state in which the wiper arm spoiler device 58b is coupled to the wiper rod 18b, the coupling element 74b surrounds the wiper rod 18b to a large extent. The coupling element 74b has in a plane perpendicular to the main extent axis 72b of the wiper rod 18b a peripheral portion which is not completely closed. The peripheral portion which is not completely closed is provided to allow the wiper rod 18b to pass in the event of assembly and/or disassembly. The coupling element 74b is provided to receive and retain the wiper rod 18b. The coupling element 74b is provided to securely couple the wiper arm spoiler device 58b to the wiper rod 18b. The wiper rod 18*b* is received in a positive-locking manner in the wiper arm spoiler device 58*b* by means of the coupling element 74*b*.

Furthermore, the wiper arm spoiler device 58*b* has a wind deflector unit 12*b*. The wind deflector unit 12*b* is arranged on the base member 10*b*. The wind deflector unit 12*b* is constructed integrally with the base member 10*b*. The base member 10*b* and the coupling unit 16*b* are provided to couple the wind deflector unit 12*b* to the wiper rod 18*b*. The wind deflector unit 12*b* has a wind deflector element 14*b*. The wind deflector element 14*b* has a wind direction face 76*b*. The wind direction face 76*b* is provided to direct an air flow, preferably a travel wind.

Furthermore, the wiper arm spoiler device 58*b* has a washing water channel unit 22*b*. The washing water channel unit 22*b* has two washing water channels 24*b*, 26*b* to guide the washing water. The washing water channel unit 22*b* comprises a first washing water channel 24*b* and a second washing water channel 26*b*. The second washing water channel 26*b* is provided to direct washing water to the first spay nozzle elements 46*b* and second spray nozzle elements 48*b*. The two washing water channels 24*b*, 26*b* are each constructed in a circular-cylindrical manner. Furthermore, the two washing water channels 24*b*, 26*b* are each delimited by a hose line 50*b*, 52*b*. The first washing water channel 24*b* is delimited by a first hose line 50*b*. The second washing water channel 26*b* is delimited by a second hose line 52*b*.

The spray nozzle elements 46*b*, 48*b* each have a cylindrical spray channel. The first spray nozzle element 46*b* is provided to discharge washing water from the first washing water channel 24*b*. The second spray nozzle element 48*b* is provided to discharge washing water from the second washing water channel 26*b*. The spray nozzle elements 46*b*, 48*b* are each orientated in such a manner that they discharge washing water onto the surface 64*a* which is intended to be washed. The spray nozzle elements 46*b*, 48*b* each have a main spray direction. The main spray direction extends in each case substantially parallel with a main extent axis of the spray nozzle element 46*b*, 48*b* which is constructed as a cylindrical channel and is orientated so as to face away from the respective washing water channel 24*b*, 26*b*. Furthermore, the main extent axes of the spray nozzle elements 46*b*, 48*b*, extends in each case transversely relative to the main extent axis 72*b* of the wiper rod 18*b*. Furthermore, the main extent axis of the first spray nozzle element 46*b* extends perpendicularly relative to a main extent axis of the first washing water channel 24*b*. Furthermore, the main extent axis of the second spray nozzle element 48*b* extend perpendicularly to a main extent axis of the second washing water channel 26*b*. The first spray nozzle elements 46*b* are arranged on the first hose line 50*b*. Furthermore, the first spray nozzle elements 46*b* are constructed integrally with the first hose line 50*b*. The first hose line 50*b* delimits the first spray nozzle elements 46*b* which are constructed as a cylindrical channel. The second spray nozzle elements 48*b* are arranged on the second hose line 52*b*. Furthermore, the second spray nozzle elements 48*b* are constructed integrally with the second hose line 52*b*. The second hose line 52*b* delimits the second spray nozzle elements 48*b* which are constructed as a cylindrical channel.

The wiper arm spoiler device 58*b* further has a receiving unit 28*b* which is arranged on the base member 10*b*. The receiving unit 28*b* is provided to receive the two washing water channels 24*b*, 26*b*. Furthermore, the receiving unit 28*b* is provided to arrange the two washing water channels 24*b*, 26*b* on the wind deflector unit 12*b* in such a manner that the two washing water channels 24*b*, 26*b* in the coupled state of the base member 10*b* on the wiper rod 18*b* are arranged outside two center planes 30*b*, 32*b* of the wiper rod 18*b*. The wiper rod 18*b* has a first center plane 30*b* and a second center plane 32*b*. The first center plane 30*b* extends perpendicularly to a first side face of the rectangular cross-section of the wiper rod 18*b* and through a geometric center point of the rectangular cross-section of the wiper rod 18*b*. The second center plane 32*b* extends perpendicularly to a second side face of the rectangular cross-section of the wiper rod 18*b*, which extends perpendicularly to the first side face and through the geometric center point of the rectangular cross-section of the wiper rod 18*b*. The two washing water channels 24*b*, 26*b* are arranged without any intersection with the center plane on the wiper rod 18*b*. The two washing water channels 24*b*, 26*b* are arranged in a received state spaced apart from the two center planes 30*b*, 32*b* of the wiper rod 18*b*. In the received state, the two washing water channels 24*b*, 26*b* are received by the receiving unit 28*b*. A wall which delimits the first washing water channel 24*b* has no intersection with one of the two center planes 30*b*, 32*b* of the wiper rod 18*b*. In the received state, the first hose line 50*b* has no intersection with one of the center planes 30*b*, 32*b* of the wiper rod 18*b*. A wall which delimits the second washing water channel 26*b* has no intersection with one of the two center planes 30*b*, 32*b* of the wiper rod 18*b*. In the received state, the second hose line 52*b* has no intersection with one of the center planes 30*b*, 32*b* of the wiper rod 18*b*.

Furthermore, the two hose lines 50*b*, 52*b* are arranged outside two center planes 80*b*, 82*b* of the coupling recess delimited by the coupling element 74*b*. The coupling recess delimited by the coupling element 74*b* of the coupling unit 16*b* has a square contour. The square contour has a first center plane 80*b* and a second center plane 82*b*. The first center plane 80*b* of the square contour extends substantially parallel with a main extent plane of the base member 10*b*. The second center plane 82*b* extends substantially perpendicularly to the main extent plane of the base member 10*b*, the wind deflector unit 12*b* and/or the coupling unit 16*b*. The two center planes 80*b*, 82*b* of the contour which delimits the coupling recess extend through a geometric center point of the square contour. In the received state, the first washing water channel 24*b* and the second hose line 50*b* have no intersection with the two center planes 80*b*, 82*b* of the square recess. In the received state, the second washing water channel 26*b* and the second hose line 52*b* have no intersection with the two center planes 80*b*, 82*b* of the square recess. The first center plane 80*b* extends parallel with the first center plane 30*b* of the wiper rod 18*b*. The second center plane 82*b* extends parallel with the second center plane 32*b* of the wiper rod 18*b*.

Furthermore, the receiving unit 28*b* has two receiving elements 38*b*, 40*b*. The two receiving elements 38*b*, 40*b* are constructed integrally with the base member 10*b*. The receiving unit 28*b* has a first receiving element 38*b* and a second receiving element 40*b*. The first receiving element 38*b* is provided to receive the first hose line 50*b*. The second receiving element 40*b* is provided to receive the second hose line 52*b*. The two receiving elements 38*b*, 40*b* delimit to a large extent a receiving space. Furthermore, the two receiving elements 38*b*, 40*b* are each constructed as clamping elements. The two receiving elements 38*b*, 40*b* each have a clamping wing 78*b*. The clamping wing 78*b* is provided, in the state in which the first hose line 50*b* is received on the first receiving element 38*b* and/or the second hose line 52*b* is received on the second receiving element 40*b*, to retain the respective hose line 50*b*, 52*b* in a clamped manner. The clamping wing 78*b* is further provided to apply a clamping force to the hose line 50*b*, 52*b*. Furthermore, the clamping wing 78*b* is provided to retain the hose line 50*b*, 52*b* in each case in the receiving space of the first receiving element 38*b* or the second receiving element 40*b*. A periphery of the receiving space is not completely closed in the plane perpendicular to the main extent axis 72*b* of the wiper rod 18*b*. During assembly, the clamping wing 78*b* is provided to be resiliently redirected. Furthermore, the resilient redirection of the clamping wing 78*b* is provided for opening the receiving space for receiving one of the two hose lines 50*b*, 52*b* in each case. The clamping wing 78*b* is provided to be resiliently redirected during assembly. The receiving space extends substantially parallel with the main extent axis 72*b* of the wiper rod 18*b*.

The two washing water channels 24*b*, 26*b* are arranged at two different sides of the base member 10*b* separated by a main extent plane of the base member 10*b*. The two hose lines 50*b*, 52*b* are received by the receiving unit 28*b* at two different sides of the base member 10*b* separated by the main extent plane of the base member 10*b*. The two receiving elements 38*b*, 40*b* are arranged offset with respect to each other on the coupling unit 16*b* along an axis perpendicular to the main extent plane of the base member 10*b*. The two receiving elements 38*b*, 40*b* each have a main extent axis. The respective main extent axis of the two receiving elements 38*b*, 40*b* extends in the coupled state parallel with the main extent axis 72*b* of the wiper rod 18*b*. The two receiving elements 38*b*, 40*b* are provided to receive the two hose lines 50*b*, 52*b* in each case at side faces of the base member 10*b* facing away from each other. The two receiving elements 38*b*, 40*b* are provided to receive and arrange the two hose lines 50*b*, 52*b* in each case at side faces of the base member 10*b* which extend parallel with each other.

Furthermore, the wind deflector unit 12*b* is formed from two material components 34*b*, 36*b*. The two washing water channels 24*b*, 26*b* are each delimited by a first material component 34*b* and a second material component 36*b*. The two hose lines 50*b*, 52*b* are each formed by the two material components 34*b*, 36*b*. The first hose line 50*b* which delimits the first washing water channel 24*b* is constructed integrally with the first material component 34*b* and integrally with the second material component 36*b*. The second hose line 52*b* which delimits the second washing water channel 26*b* is constructed integrally with the first material component 34*b* and integrally with the second material component 36*b*. The two hose lines 50*b*, 52*b* which delimit the washing water channels 24*b*, 26*b* are each constructed as a multiple-component molded component. The two material components 34*b*, 36*b* have a fixed connection to each other. The first material component 34*b* has relative to the second material component 36*b* a lower level of resilience. The second material component 36*b* has a modulus of elasticity which is 80% greater than that of the first material component 34*b*. The additional material component 36*b* delimits the spray channel of the first spray nozzle elements 46*b* and the spray channel of the second spray nozzle elements 48*b*. The second material component 36*b* is provided to stiffen the first hose line 50*b* in the region of the first spray nozzle elements 46*b*. Furthermore, the second material component 36*b* is provided to stiffen the second hose line 52*b* in the region of the second spray nozzle elements 48*b*. The spray nozzle elements 46*b*, 48*b* are constructed integrally with the second material component 36*b*.

Furthermore, the wiper arm spoiler device 58*b* has a first heating element 54*b* and a second heating element 56*b*. The first heating element 54*b* is arranged on the first receiving element 38*b* of the receiving unit 28*b*. The first heating element 54*b* is provided to heat the first washing water channel 24*b* in the state received on the receiving unit 28*b*. The second heating element 56*b* is provided to heat the second washing water channel 26*b* in the state received on the receiving unit 28*b*. The heating elements 54*b*, 56*b* are further integrated in the base member 10*b*. The two heating elements 54*b*, 56*b* are each constructed as an electric heating wire. A material of the base member 10*b* is injected around the two heating elements 54*b*, 56*b*. The two heating elements 54, 56*b* are each orientated parallel with the main extent axis 72*b* of the wiper rod 18*b*. Furthermore, the two heating elements 54*b*, 56*b* are each arranged in the vicinity of the receiving space delimited by the first or the second receiving element 38*b*, 40*b*. The two heating elements 54*b*, 56*b* each have in an installed state a spacing value of a maximum spacing with respect to a delimitation of the receiving space from a spacing value range from 1 mm to 5 mm.

What is claimed is:

1. A wiper arm spoiler device comprising
a base member (10*a*; 10*b*),
a wind deflector unit (12*a*; 12*b*) which is arranged on the base member (10*a*; 10*b*) and which has at least one wind deflector element (14*a*; 14*b*) extending vertically upwardly from the base member (10; 10*b*) along a direction that is configured to be perpendicular to and extend away from a windshield during use of the wiper arm spoiler device, wherein the wind deflector unit (12*a*; 12*b*) includes a concave wind direction face (76*a*) along one side of the wind deflector unit (12*a*; 12*b*) that defines a narrowing portion of the wind deflector unit (12*a*; 12*b*), wherein a lateral width of the wind deflector unit (12*a*; 12*b*) in the narrowing portion decreases moving vertically upwardly away from the base member (10*a*; 10*b*), wherein an upper free terminal end of the wind deflector unit (12*a*; 12*b*) defines a tip of the wind deflector unit (12*a*; 12*b*);
a coupling unit (16*a*; 16*b*) which is integral with the base member (10*a*, 10*b*), and is configured to couple the wind deflector unit (12*a*; 12*b*) to a wiper rod (18*a*; 18*b*) of a wiper arm (20*a*; 20*b*), wherein the coupling unit (16*a*; 16*b*) includes a cavity configured to receive the wiper rod (18*a*; 18*b*), wherein the coupling unit (16*a*; 16*b*) includes an arm configured to extend underneath the wiper rod (18*a*; 18*b*) when the wiper rod (18*a*; 18*b*) is received by the cavity, wherein the arm partially defines the cavity, and
at least one washing water channel (24*a*; 24*b*, 26*b*) disposed within the wind deflector unit (12*a*; 12*b*), wherein the cavity is disposed vertically between the washing water channel (24*a*; 24*b*; 26*b*) and the arm, and wherein the washing water channel (24*a*; 24*b*; 26*b*) is disposed within the narrowing portion of the wind deflector unit (12*a*; 12*b*) at a location that is closer to the tip of the wind deflector unit (12*a*, 12*b*) than to the cavity, wherein at least one vertical line that passes through the tip and through the cavity also passes through the water channel.

2. The wiper arm spoiler device according to claim 1, characterized in that the at least one washing water channel (24*a*) is constructed at least partially integrally with the wind deflector unit (12*a*).

3. The wiper arm spoiler device according to claim 1, further comprising at least one spray nozzle element (46*a*; 46*b*, 48*b*).

4. The wiper arm spoiler device according to claim 3, characterized in that the at least one spray nozzle element (46*a*) is constructed at least partially integrally with the wind deflector unit (12*a*).

5. The wiper arm spoiler device according to claim 1, characterized in that the base member (10*a*; 10*b*), the wind deflector unit (12*a*; 12*b*), a wall which delimits the at least one washing water channel (24*a*; 24*b*, 26*b*) and/or the coupling unit (16*a*; 16*b*) are constructed from at least two material components (34*a*, 36*a*; 34*b*, 36*b*).

6. The wiper arm spoiler device according to claim 5, characterized in that at least one material component (34*a*; 34*b*) of the at least two material components (34*a*, 36*a*; 34*b*, 36*b*) has relative to at least one additional material component (36*a*; 36*b*) of the at least two material components (34*a*, 36*a*; 34*b*, 36*b*), a lower level of resilience and the at least one washing water channel (24*a*; 24*b*, 26*b*) and/or the at least one spray nozzle element (46*a*; 46*b*, 48*b*) is formed at least partially integrally by the at least one additional material component (36*a*; 36*b*) or is delimited by the at least one additional material component (36*a*; 36*b*).

7. The wiper arm spoiler device according to claim 5, characterized in that at least one material component (34*a*; 34*b*) of the at least two material components (34*a*, 36*a*; 34*b*, 36*b*) has relative to at least one additional material component (36*a*; 36*b*) of the at least two material components (34*a*, 36*a*; 34*b*, 36*b*), in a solidified state, a lower level of resilience and the at least one washing water channel (24*a*; 24*b*, 26*b*) and/or the at least one spray nozzle element (46*a*; 46*b*, 48*b*) is formed at least partially integrally by the at least one additional material component (36*a*; 36*b*) or is delimited by the at least one additional material component (36*a*; 36*b*).

8. The wiper arm spoiler device according to claim 1, further comprising at least one heating element (54*a*; 54*b*, 56*b*).

9. The wiper arm spoiler device according to claim 1, characterized in that the at least one washing water channel (24*a*; 24*b*, 26*b*) in a coupled state of the base member (10*a*; 10*b*) on the wiper rod (18*a*; 18*b*) is arranged outside center planes (30*a*, 32*a*; 30*b*, 32*b*) of the wiper rod (18*a*; 18*b*).

10. The wiper arm spoiler device according to claim 1, further comprising at least one integrated heating element (54*a*; 54*b*, 56*b*).

11. A windshield wiper having at least one wiper arm (20*a*; 20*b*) and having at least one wiper arm device (58*a*; 58*b*) according to claim 1.

12. A wiper arm spoiler device comprising
a base member (10*a*),
a wind deflector unit (12*a*) which is arranged on the base member (10*a*) and which has at least one wind deflector element (14*a*), wherein the wind deflector unit (12*a*) is constructed from a first material (34*a*) and a second material (36*a*) fixedly connected to the first material (34*a*), wherein the second material (36*a*) is different than the first material (34*a*), wherein the second material (36*a*) is more resilient than the first material (34*a*),
a coupling unit (16*a*) which is configured to couple the wind deflector unit (12*a*) to a wiper rod (18*a*) of a wiper arm (20*a*), and
a washing water channel (24*a*) defined by the second material (36*a*), wherein the second material (36*a*) includes a first portion that extends circumferentially around the washing water channel (24*a*), such that the first portion is disposed radially between the washing water channel (24*a*) and the first material (34*a*), wherein the second material (36*a*) includes a second portion that extends axially away from the first portion, and wherein the second portion defines a spray nozzle element (46*a*) that extends to an exterior of the wind deflector unit (12*a*) at a terminal end of the nozzle element, the first material engages and covers the second portion extending from the first portion to the terminal end.

13. The wiper arm spoiler device of claim 12, wherein the spray nozzle element (46*a*) defines a spray channel that is in fluid communication with the washing water channel (24*a*).

14. The wiper arm spoiler device of claim 12, wherein the first and second materials (34*a*, 36*a*) are integrally connected to one another in a solidified state.

* * * * *